(12) United States Patent
Abram et al.

(10) Patent No.: US 9,863,559 B2
(45) Date of Patent: Jan. 9, 2018

(54) THIN WALL WELDING

(71) Applicant: Faurecia Emissions Control Technologies, USA, LLC, Columbus, IN (US)

(72) Inventors: Kwin Abram, Columbus, IN (US); Thomas Wahl, Seymour, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 511 days.

(21) Appl. No.: 14/102,983

(22) Filed: Dec. 11, 2013

(65) Prior Publication Data

US 2015/0159787 A1 Jun. 11, 2015

(51) Int. Cl.
*B23P 15/26* (2006.01)
*B21D 53/00* (2006.01)
(Continued)

(52) U.S. Cl.
CPC .......... *F16L 13/0245* (2013.01); *B23K 20/24* (2013.01); *B23K 31/02* (2013.01);
(Continued)

(58) Field of Classification Search
CPC . B60K 13/04; B23K 2201/04–2201/14; B23K 31/027; B23K 31/02; B23K 20/24; B23K 2201/06; F16L 13/02; F16L 13/0209; F16L 13/14; F16L 13/147; F16L 13/0245; F01N 2470/24; F01N 2450/22; B21D 39/04; B21D 39/046; B21D 39/048; F28D 7/10; B23P 15/26; B23P 2700/11; B23P 11/005; F28F 2255/00; F28F 2275/00; F28F 2275/12
(Continued)

(56) References Cited

U.S. PATENT DOCUMENTS 1,293,871 A * 2/1919 Murray ............... F16L 13/0236
114/79 W
1,870,771 A * 8/1932 De Witt ................. E04H 12/08
285/288.2
(Continued)

FOREIGN PATENT DOCUMENTS

FR 2398955 2/1979
JP 57-32892 2/1982
(Continued)

OTHER PUBLICATIONS

International Preliminary Report on Patentability for International Application No. PCT/US2014/067853 dated Jun. 23, 2016.
(Continued)

*Primary Examiner* — Sarang Afzali
*Assistant Examiner* — Darrell C Ford
(74) *Attorney, Agent, or Firm* — Carlson, Gaskey & Olds, PC

(57) ABSTRACT

An exhaust component assembly includes a first pipe that defines a center axis and has a first end, and a second pipe that has a second end inserted into the first end of the first pipe such that an outer surface of the second end is in contact with an inner surface of the first end. At least one axial weld connects the first and second ends together.

14 Claims, 1 Drawing Sheet

(51) Int. Cl.
*B21D 53/02* (2006.01)
*B21D 39/00* (2006.01)
*B23P 11/02* (2006.01)
*B23P 11/00* (2006.01)
*B60K 13/04* (2006.01)
*B23K 31/02* (2006.01)
*F16L 13/02* (2006.01)
*B23K 20/24* (2006.01)
*F01N 13/18* (2010.01)
*B23K 101/06* (2006.01)

(52) U.S. Cl.
CPC ........ *B23K 31/027* (2013.01); *F01N 13/1805* (2013.01); *B23K 2201/06* (2013.01); *F01N 2450/22* (2013.01); *F01N 2470/24* (2013.01)

(58) Field of Classification Search
USPC ......... 29/890.08, 890, 890.03, 890.036, 507, 29/508, 516, 521, 522.1, 523, 527.1; 228/101, 164–174, 182; 180/296, 309; 285/288.1, 288.2, 288.5, 288.6
See application file for complete search history.

(56) References Cited

U.S. PATENT DOCUMENTS

| | | | | |
|---|---|---|---|---|
| 2,152,076 | A * | 3/1939 | Menough | F27D 3/026 193/37 |
| 4,142,366 | A * | 3/1979 | Tanahashi | F01N 13/08 138/148 |
| 4,200,218 | A * | 4/1980 | Koehler | E21B 43/088 228/165 |
| 4,270,689 | A * | 6/1981 | Canfield | F01N 13/1805 228/152 |
| 5,100,047 | A | 3/1992 | Nakagawa et al. | |
| 5,674,461 | A * | 10/1997 | Kato | F01N 3/2807 137/625.32 |
| 5,901,988 | A * | 5/1999 | Aihara | F01N 13/08 138/115 |
| 6,062,266 | A * | 5/2000 | Burkhardt | F16L 51/03 138/114 |
| 6,843,516 | B2 * | 1/2005 | Bishop | F16L 21/06 277/605 |
| 8,454,057 | B2 * | 6/2013 | Gipson | F16L 13/0209 285/288.1 |
| 9,528,638 | B2 * | 12/2016 | Hooberman | B29C 65/3656 |
| 2007/0163785 | A1 * | 7/2007 | Shuster | E21B 17/08 166/380 |
| 2009/0065556 | A1 | 3/2009 | Finton et al. | |
| 2010/0083482 | A1 * | 4/2010 | Wirth | F01N 3/2892 29/469.5 |
| 2010/0229993 | A1 * | 9/2010 | Abram | B21D 39/04 138/114 |
| 2011/0047998 | A1 * | 3/2011 | Adachi | F01N 13/008 60/324 |
| 2011/0114216 | A1 * | 5/2011 | Blueml | B23K 1/002 138/155 |
| 2012/0165738 | A1 | 6/2012 | Harms et al. | |
| 2013/0076025 | A1 * | 3/2013 | Gipson | F16L 13/0209 285/288.1 |
| 2016/0362144 | A1 * | 12/2016 | Potthast | B23K 31/02 |

FOREIGN PATENT DOCUMENTS

JP 09122742 A 5/1997
JP 2003333721 A 11/2003

OTHER PUBLICATIONS

International Search Report and Written Opinion for International Application No. PCT.US2014/067853 dated Mar. 16, 2015.

* cited by examiner

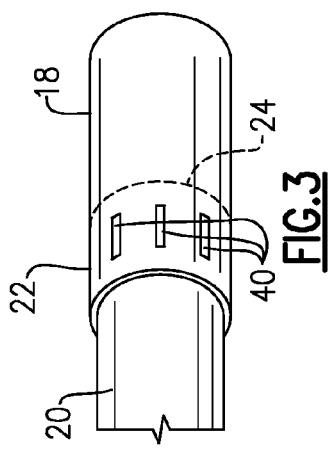
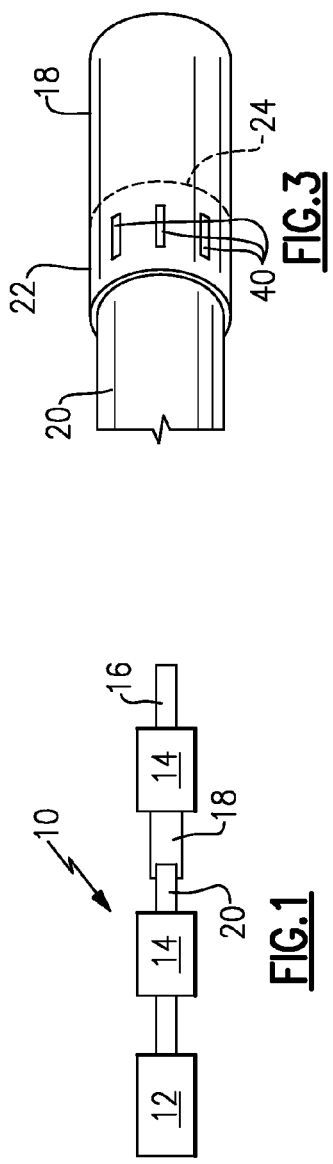
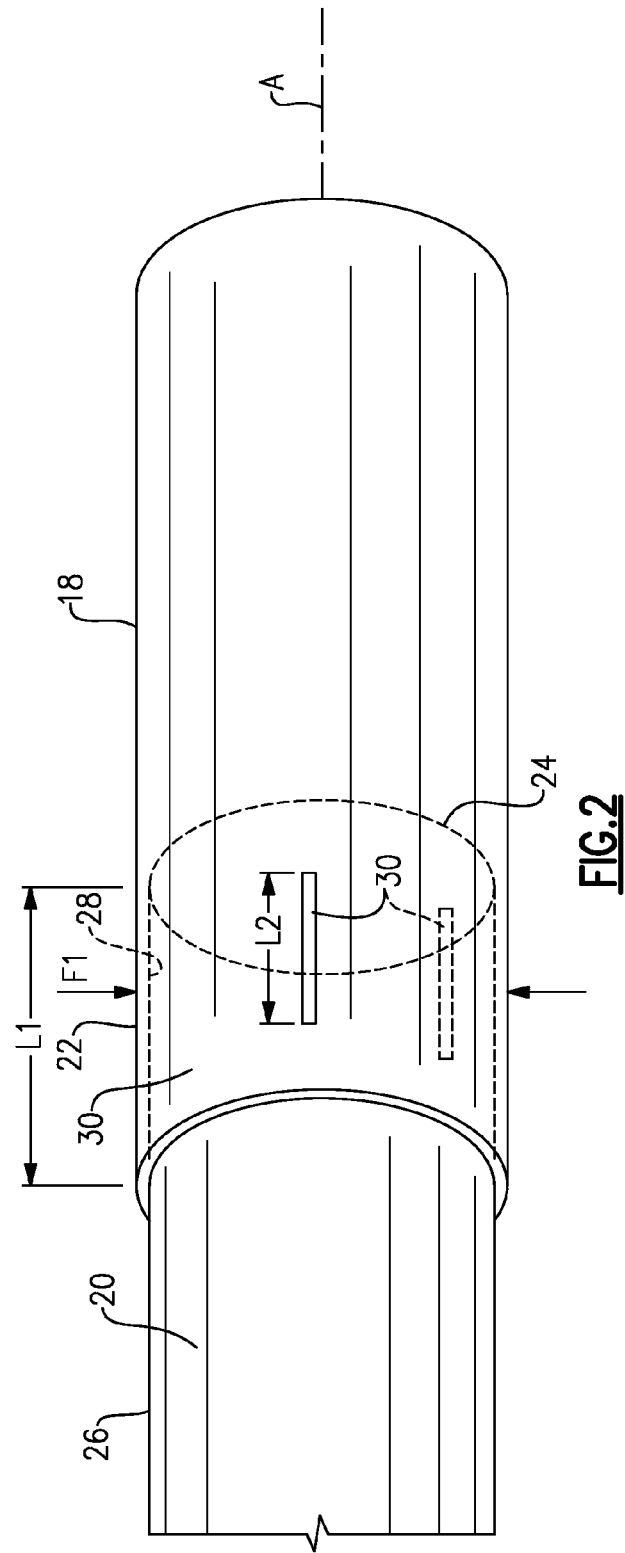

THIN WALL WELDING

TECHNICAL FIELD

The subject invention relates to welding pipe sections together for use in a vehicle exhaust system.

BACKGROUND OF THE INVENTION

An exhaust system includes pipe sections that are welded together. Typically, one end of a pipe is inserted into an open end of a connecting pipe and the pipes are brazed or welded together via a peripheral joint that extends about an inner or outer circumference of the pipes at the connection interface.

As known, the pipes are not sized to fit perfectly together. As such, a clearance exists between the two pipes prior to welding. The circumferential weld provided about the periphery to connect the pipes together fills in this clearance to provide a leak free connection. However, this circumferential weld creates a stress riser that extends 360 degrees around the pipes at the connection interface. This joint is subjected to high heat and high levels of vibration which can cause cracks to be generated at the stress riser. This can result in premature wear and/or fracture of the joint.

Brazing also has some disadvantages. This connection method requires additional brazing material, requires high grade pipe material, and has temperature limits.

SUMMARY OF THE INVENTION

In one exemplary embodiment, an exhaust component assembly includes a first pipe that defines a center axis and has a first end, and a second pipe that has a second end inserted into the first end of the first pipe such that an outer surface of the second end is in contact with an inner surface of the first end. At least one axial weld connects the first and second ends together.

In a further embodiment of the above, the at least one axial weld comprises a plurality of axial welds that are spaced apart from each other circumferentially about the center axis.

In a further embodiment of any of the above, the first and second ends overlap each other by a first length, and wherein the axial welds have a second length that is less than the first length.

In another exemplary embodiment, a method of connecting a first end of a first pipe to a second end of a second pipe includes the steps of: inserting the second end into the first end; yielding at least one of the first and second ends such that an outer surface of the second pipe is in contact with the inner surface of the first pipe; and welding the first end to the second end with at least one axial weld.

In a further embodiment of any of the above, the at least one axial weld comprises a plurality of axial welds, the axial welds are circumferentially spaced apart from each other about the center axis.

In a further embodiment of any of the above, the axial welds are formed to be generally parallel to the center axis.

In a further embodiment of any of the above, the first and second ends overlap each other by a first length, and the axial welds are formed to have a second length that is less than the first length.

In a further embodiment of any of the above, at least one of the first and second ends are plastically deformed such that the first end is in abutting contact with the second end.

In a further embodiment of any of the above, at least one of the first and second ends are re-sized down by applying an external force to at least one of the first and second ends to create a line-to-line fit between the first and second ends.

In a further embodiment of any of the above, at least one of the first and second ends are expanded out by applying an internal force to at least one of the first and second ends to create a line-to-line fit between the first and second ends.

In a further embodiment of any of the above, at least one slit is provided in the first end and the at least one axial weld is welded along the at least one slit.

These and other features of this application will be best understood from the following specification and drawings, the following of which is a brief description.

BRIEF DESCRIPTION OF THE DRAWINGS

FIG. 1 schematically illustrates one example of an exhaust system incorporating the subject invention.

FIG. 2 is a perspective view of a pipe mounting configuration from FIG. 1.

FIG. 3 schematically illustrates an example of a pipe with slits.

DETAILED DESCRIPTION

FIG. 1 shows a vehicle exhaust system 10 that conducts hot exhaust gases generated by an engine 12 through various exhaust components 14 to reduce emission and control noise as known. The various exhaust components 14 can include diesel oxidation catalysts (DOC), selective catalytic reduction (SCR) catalysts, particulate filters, mufflers, exhaust pipes, etc. These components 14 can be mounted in various different configurations and combinations dependent upon vehicle application and available packaging space. Engine exhaust gases go through the components 14 and exit to the atmosphere via a tailpipe 16.

Throughout the exhaust system 10 there are many different locations where two pipes 18, 20 are welded together. FIG. 1 shows one example of how a first pipe 18 is connected to a second pipe 20 within the exhaust system 10. The first pipe 18 has a first end 22 and the second pipe 20 has a second end 24. The second end 24 is inserted into the first end 22 such that the pipes 18, 20 form an exhaust gas passageway within the exhaust system 10. Then, at least one of the first 22 and second 24 ends are re-sized and yielded such that at least a portion of an outer surface 26 of the second pipe 20 is in contact with an inner surface 28 of the first pipe 18. In one example, both the first 22 and second 24 ends are re-sized and yielded. Then, the first end 22 is welded to the second end 24 with at least one axial weld 30.

In one example, the first pipe 18 defines a center axis A, and the at least one axial weld 30 comprises a plurality of axial welds 30. The axial welds 30 are circumferentially spaced apart from each other about the center axis A. In one example, the axial welds 30 are formed to be generally parallel to the center axis A; however, the axial welds could also be orientated to be at an angle relative to the center axis A.

The first 22 and second 24 ends overlap each other by a first length L1. In one example, the overlap length L1 is within a range of 25 mm to 75 mm; however, other ranges could be used. The axial welds 30 are formed to have a second length L2 that is less than the first length L1. Thus, the axial welds are small, discrete linearly extending welds that are applied to only a very small portion of the overall diameter of the overlapped pipes 18, 20.

The step of yielding at least one of the first 22 and second 24 pipe ends includes taking one or both parts past yield by plastically or permanently deforming the first 22 and/or second 24 ends such that a portion of the first end 22 is in abutting contact with a portion of the second end 24. In one example, at least one of the first 22 and second 24 ends is sized down by applying an external force F1 to the first 22 and second 24 ends to create a line-to-line fit between the first 22 and second 24 ends. In another example, both the first 22 and second 24 ends are sized down by the external force F1. Optionally, at least one of the first 22 and second 24 ends can be expanded out by applying an internal force (in a direction opposite to external force F1) to the first 22 and second 24 ends to create a line-to-line fit between the first 22 and second 24 ends. In another example, both the first 22 and second 24 ends are expanded. The intention is to have a tight, gap-free interface (or only a very small clearance) between the pipes.

Welding of the two pipes 18, 20 together could be accomplished by MIG welding, laser welding or TIG welding, for example. In another example shown in FIG. 3, the first end 22 of the first pipe 18 includes a plurality of slits 40, with one slit 40 for each axial weld 30. In this example, MIG welding, laser welding, or TIG welding can be used to form the axial welds 30 along the slits 40.

The axial welds are formed via two layers, i.e. the first 18 and second 20 pipes, at each weld location. This is different than a circumferential weld joint where one side of the weld is through two layers, i.e. first and second pipes, and the other side of the weld is only through one layer, i.e. the first pipe. Further, with axial welds, welding variability should be easily tolerated without introducing stress risers.

Welding from the outside provides a contraction of the outside pipe 18 due to there being more heat and molten material at the weld location on the outside pipe 18 versus the inside pipe 20. After welding, as the first pipe 18 cools, the first pipe 18 contracts more tightly onto the second pipe 20. This increases strength and decreases the possibility of leaks. Thus, even if there is a slight clearance between the pipes 18, 20 after the yielding step, this clearance will be eliminated after the first pipe 18 cools after welding due to the contraction of the first pipe 18.

Sizing pipes together and then adding welds in an axial direction improves joint strength, enables the use of thinner wall tubing, simplifies welding (reduced weld position requirements), reduces joint gas leak, and does not require weld wire. One important feature is that the welding only occurs along the pipe diameter in a discrete number of locations, e.g. 4 to 8 locations for example, which are via thin wall interfaces. The majority of the diameter is undisturbed by welding making the joint very strong and less susceptible to cracking as compared to circumferential welding. Further, the high strain points always occur in a double wall thickness zone with non-welded material on both sides to add strength.

The subject invention provides several advantages over brazing too. There is no filler material required and lower cost pipe material can be used. Further, higher temperature capabilities are provided.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method of connecting a first end of a first pipe to a second end of a second pipe in a vehicle exhaust system comprising:
   inserting the second end into the first end;
   having the first pipe define a center axis for an exhaust gas passageway;
   providing the first end with an uninterrupted external surface that extends about the center axis;
   yielding at least one of the first and second ends such that an outer surface of the second pipe is in contact with the inner surface of the first pipe; and
   welding the first end to the second end by axially welding along the external surface to provide a plurality of axial welds that are circumferentially spaced apart from each other about the center axis at discrete locations, and wherein the axial welds are the only welds used to weld the first end to the second end.

2. The method according to claim 1 including:
   welding a first discrete axial weld of the plurality of axial welds, and
   welding a second discrete axial weld of the plurality of axial welds that is circumferentially spaced from the first discrete axial weld relative to the center axis such that welding of the first end to the second end only occurs in a discrete number of locations.

3. The method according to claim 2, including forming the first and second discrete axial welds to be generally parallel to the center axis.

4. The method according to claim 2, including overlapping the first and second ends by a first length, and forming the first and second axial welds to have a second length that is less than the first length.

5. The method according to claim 1, wherein the yielding step includes plastically deforming at least one of the first and second ends such that the first end is in overlapping contact with the second end.

6. The method according to claim 5, including re-sizing at least one of the first and second ends down by applying an external force to at least one of the first and second ends to create a line-to-line fit between the first and second ends.

7. The method according to claim 5, including expanding at least one of the first and second ends out by applying an internal force to at least one of the first and second ends to create a line-to-line fit between the first and second ends.

8. The method according to claim 1, including providing at least one slit in the first end and welding the at least one axial weld along the at least one slit.

9. The method according to claim 1 including yielding both the first and second ends.

10. The method according to claim 1 including forming at least one slit for each axial weld in the first end and axially welding along each slit to form a discrete axial weld.

11. The method according to claim 10 including providing a plurality of slits and spacing each slit axially away from an end of the first end of the first pipe to provide a plurality of discrete axial welds that are circumferentially spaced apart from each other about a circumference of the first end.

12. A method of connecting a first end of a first pipe to a second end of a second pipe in a vehicle exhaust system comprising:
   inserting the second end into the first end;
   yielding at least one of the first and second ends such that an outer surface of the second pipe is in contact with the inner surface of the first pipe;
   welding the first end to the second end with a plurality of axial welds;
   forming at least one slit for each axial weld in the first end and axially welding along each slit to form a discrete axial weld, and spacing each slit axially away from an end of the first end of the first pipe to provide a plurality of discrete axial welds that are circumferentially spaced apart from each other about a circumference of the first end; and wherein the discrete axial welds are the only welds used to weld the first end to the second end.

13. A method of connecting a first end of a first pipe to a second end of a second pipe in a vehicle exhaust system comprising:

having the first pipe define a center axis for an exhaust gas passageway;

providing the first end with an uninterrupted external surface that extends about the center axis;

inserting the second end into the first end;

yielding at least one of the first and second ends to couple the first and second pipes together; and welding the first end to the second end with a plurality of discrete axial welds that are circumferentially spaced apart from each other about the center axis, and forming the discrete axial welds by axially welding along the external surface, and wherein the discrete axial welds are the only welds used to weld the first end to the second end.

14. The method according to claim 13 including forming a discrete slit in the first end for each discrete axial weld such that the slits are spaced from an edge of the first end, and axially welding the first end to the second end through the slits.

* * * * *